(12) United States Patent
Pellerin et al.

(10) Patent No.: US 7,340,815 B2
(45) Date of Patent: Mar. 11, 2008

(54) METHOD FOR INSERTING A VALVE STEM IN A VALVE STEM APERTURE DEFINED BY A WHEEL

(75) Inventors: Dan Pellerin, Howell, MI (US); Chad A. Sinke, Hartland, MI (US); Brian Hoy, Brighton, MI (US)

(73) Assignee: Durr Production Systems, Inc., Farmington, MI (US)

( * ) Notice: Subject to any disclaimer, the term of this patent is extended or adjusted under 35 U.S.C. 154(b) by 0 days.

(21) Appl. No.: 11/699,685

(22) Filed: Jan. 30, 2007
(Under 37 CFR 1.47)

(65) Prior Publication Data

US 2007/0119039 A1    May 31, 2007

Related U.S. Application Data (62) Division of application No. 10/740,296, filed on Dec. 18, 2003, now Pat. No. 7,181,832.

(60) Provisional application No. 60/453,262, filed on Mar. 10, 2003, provisional application No. 60/460,153, filed on Apr. 3, 2003.

(51) Int. Cl.
*B23Q 17/00* (2006.01)
*B23P 21/00* (2006.01)

(52) U.S. Cl. .............. 29/407.04; 29/894.351; 29/407.1; 29/714; 73/146.8

(58) Field of Classification Search ............ 29/894.37, 29/890.123, 249, 407.04, 407.09, 407.1, 29/709, 221.5; 73/146.8, 800
See application file for complete search history.

(56) References Cited

U.S. PATENT DOCUMENTS

| | | | | | |
|---|---|---|---|---|---|
| 4,441,817 | A | * | 4/1984 | Pryor | .................. 356/615 |
| 5,940,960 | A | * | 8/1999 | Doan et al. | .................. 29/714 |
| 6,026,552 | A | * | 2/2000 | Matsumoto | .............. 29/407.04 |
| 6,163,946 | A | * | 12/2000 | Pryor | .................. 29/407.04 |
| 7,185,410 | B2 | * | 3/2007 | Lawson et al. | .......... 29/407.01 |

* cited by examiner

*Primary Examiner*—David P. Bryant
*Assistant Examiner*—Sarang Afzali
(74) *Attorney, Agent, or Firm*—Howard & Howard Attorneys, P.C.

(57) ABSTRACT

A valve stem installation system includes a robotic arm for moving a valve stem insertion device around the lip of wheel. The system also includes a pair of valve stem aperture sensors positioned on the robotic arm adjacent the valve stem insertion device and moveable around the lip of the wheel. The sensors can be positioned on opposite sides of the valve stem insertion device. When the first sensor locates the valve stem aperture, movement of the robotic can be slowed. When the second sensor locates the valve stem aperture, movement of the robotic arm can be stopped. The conveyor unit can include an identification station to sense the configuration of the wheel. A controller can select the appropriate valve stem to insert in the valve stem aperture in response to the sensed configuration of the wheel.

12 Claims, 7 Drawing Sheets

Fig-10

METHOD FOR INSERTING A VALVE STEM IN A VALVE STEM APERTURE DEFINED BY A WHEEL

RELATED APPLICATIONS

This application is a divisional application of the application Ser. No. 10/740,296 filed on Dec. 18, 2003 now U.S. Pat. No. 7,181,832 that claims the benefit of the provisional patent application Ser. No. 60/453,262 for a VALVE STEM INSTALLATION SYSTEM AND METHOD OF INSTALLING VALVE STEM, filed on Mar. 10, 2003, and claims the benefit of the provisional patent application Ser. No. 60/460,153 for a TIRE PRESSURE MONITORING VALVE STEM INSTALLATION SYSTEM AND METHOD OF INSTALLING TIRE PRESSURE MONITORING VALVE STEM, filed Apr. 3, 2003, which are hereby incorporated by reference in their entireties.

FIELD OF THE INVENTION

The subject invention relates to the assembly of wheels, and more particularly to an apparatus and method for locating a valve stem aperture in a wheel and mounting the valve stem to the wheel.

BACKGROUND OF THE INVENTION

In the past, a valve stem was manually mounted to a wheel with a stem-inserting tool. Such manual processes are expensive because of the labor and time involved. In addition, operations performed manually are subject to a relatively greater frequency of processing errors in comparison to robot-performed processes.

Several prior art patents disclose processes for mounting a valve stem to a wheel with programmable machines. For example, U.S. Pat. No. 6,481,083 teaches a valve stem assembly line that includes an input conveyor to supply wheels, a locator station positioned at the end of the input conveyor to locate the valve stem aperture defined by the wheel, and a robotic manipulator to grasp the wheel in the locator station and to move the wheel to the mounting station where a valve stem is inserted. U.S. Pat. No. 6,026,552 teaches a spinning device to spin the wheel, an optical sensor to locate the valve stem aperture while the wheel is spinning, and press fitting device that can slide relative to a wheel and insert a valve stem after the valve stem aperture has been located. U.S. Pat. No. 5,940,960 teaches and automatic valve stemming apparatus including a spinning device to spin the wheel, an optical sensor to locate the valve stem aperture, and a valve stem insertion tool to insert a valve stem after the valve stem aperture has been located.

One of the areas of continuous development and research is the pursuit of flexible systems operable to receive and process several differently configured rims. Another area is the pursuit of less costly valve stem insertion devices. Costliness can be defined by the capital investment required for putting the valve stem insertion system on the factory floor as well as the operating cost associated with the system. In pursuit of these goals, it would be desirable to develop a valve stem insertion system having improved flexibility, cost and efficiency.

BRIEF SUMMARY OF INVENTION

The invention provides an apparatus and method for locating a valve stem aperture in a wheel and inserting the valve stem in the valve stem aperture. The valve stem and the valve stem aperture are moved relative to one another at a predetermined relative speed in a first rotational direction along a curved path of the wheel perimeter to align the valve stem with the valve stem aperture. The valve stem is supported with a pin and the pin is moved around the wheel with a robotic apparatus. A first sensor locates the valve stem aperture when the valve stem and the valve stem aperture are a first angular distance from one another along the curved path. In response to the first sensor locating the valve stem aperture, the relative speed of movement between the valve stem and the valve stem aperture is reduced. A second sensor locates the valve stem aperture when the valve stem and the valve stem aperture are a first angular distance from one another along the curved path.

One of the advantages of the present invention is that processing time for inserting the valve stem in the valve stem aperture is reduced. Specifically, the relative movement between the valve stem and the valve stem aperture can be maximized prior to the locating step and the first and second sensor can be spaced from one another to accommodate the braking capacity of the system. In other words, the invention substantially eliminates time delays associated with confirming the location of the valve stem aperture that are common in prior art locating systems.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
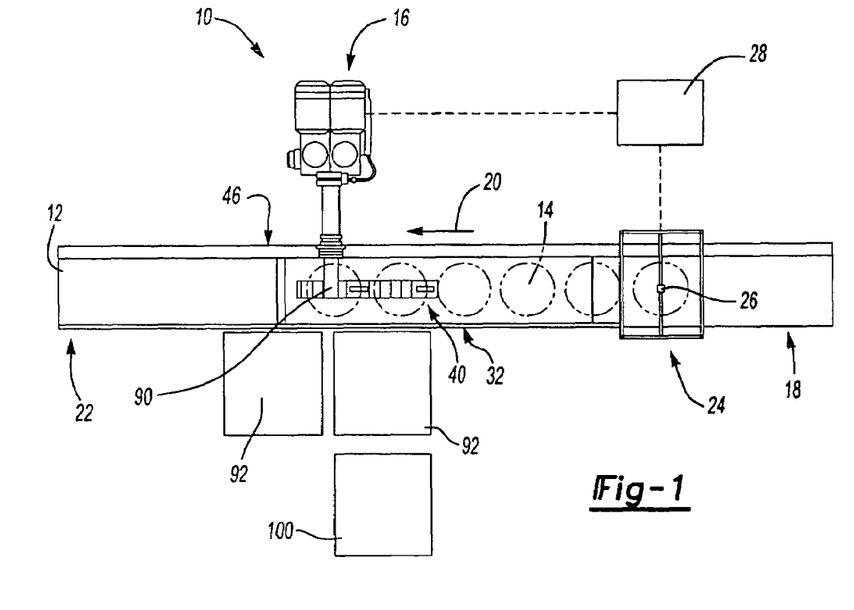
FIG. 1 is an overhead schematic view of a valve stem installation system according to the exemplary embodiment of the invention.

Referring now to FIG. 1, the present invention provides a method and apparatus 10 for inserting a valve stem in a valve stem aperture defined by a wheel. The apparatus 10 includes a conveyor 12 for moving wheels 14 past a robotic apparatus 16. Valve stems are inserted in the valve stem aperture defined by the wheel 14 by the robotic apparatus 16. Wheels 14 can be received at a beginning 18 of the conveyor 12 and move in a direction 20 to an end 22 of the conveyor 12.

Figure 2:
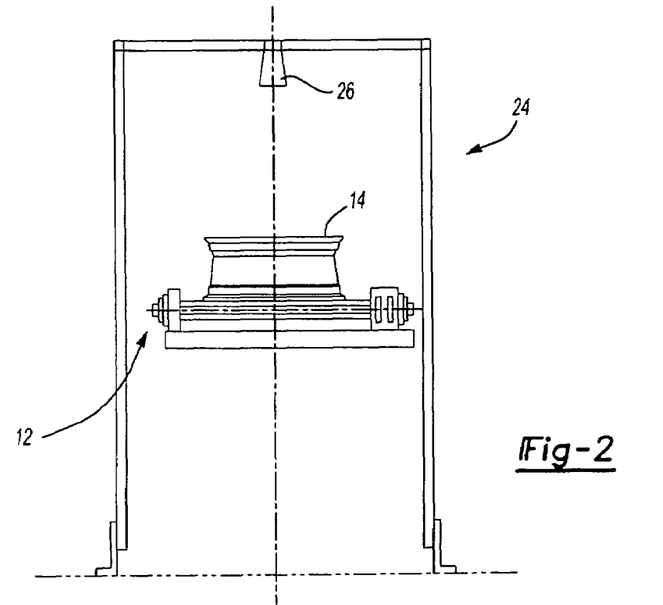
FIG. 2 is a side view of an identification station for the valve stem installation system shown in FIG. 1 for identifying an individual wheel from a plurality of differently configured wheels.

Referring now to FIGS. 1 and 2, during movement of the wheel 14 between the beginning 18 and end 22 of the conveyor 12, the wheel 14 passes through an identification station 24. The identification station 24 can include a camera 26 for identifying the wheel 14 from a plurality of differently configured wheels. When a wheel 14 moves within the visual range of the camera 26, the camera 26 communicates an image of the wheel 14 to a controller 28. The image includes structural features of the wheel 14 including the position of the valve stem aperture. The controller 28 compares the image received from the camera 26 with a plurality of images stored in memory. The images in memory correspond to all of the differently configured wheels that can pass through the identification station 24. Each of the images stored in memory is associated with structural characteristics and physical dimensions of a corresponding wheel 14. The controller 28 controls processing steps performed downstream of the identification station 24 based, at least in part, on the physical dimensions of the wheel 14 identified from the image received from the camera 26.

Figure 3:
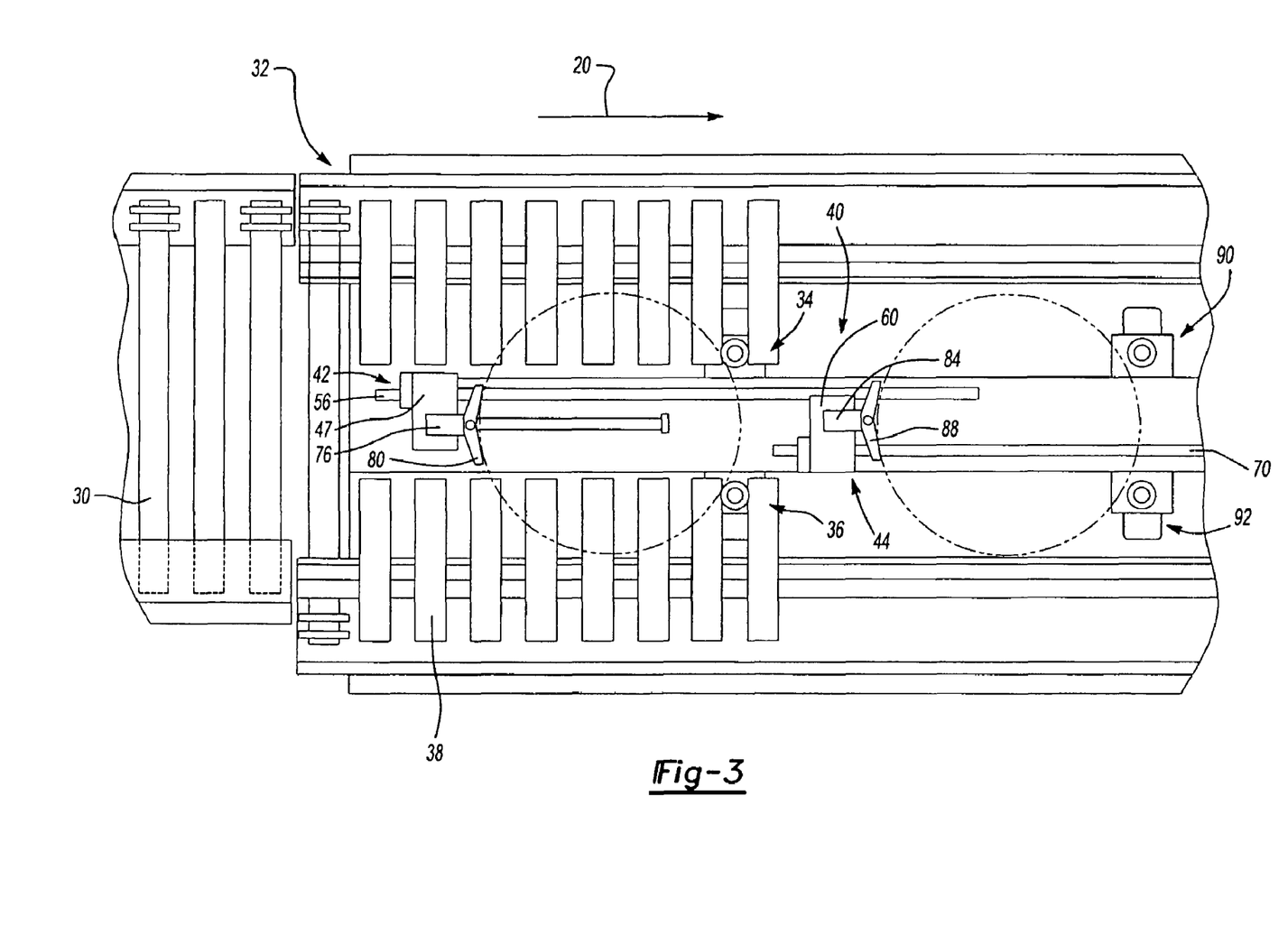
FIG. 3 is a top view of a portion of the valve stem installation system shown in FIGS. 1 and 2 showing pin stop assemblies positioned along a roller conveyor for preventing movement of a wheel along the roller conveyor.

Referring now to FIGS. 1 and 3, the conveyor 12 includes clutch-assisted, driven rollers 30 to move the wheel 14 from the identification station 24 to a first position 32 along the conveyor 12. The wheel 14 can move along the conveyor 12 in the direction 20 until the wheel 14 engages a pair of pin stops 34, 36. The conveyor 12 includes undriven rollers 38 between the first position 32 and the pin stops 34, 36. The pin stops 34, 36 are actuated between an extended position above the conveyor 12 and a retracted position below the conveyor 12 to stop movement of the wheel 14 in the direction 20 along the conveyor 12. The pin stops 34, 36 are controlled in movement by the controller 28. Sensors (not shown) are positioned along the conveyor 12 to sense the position of the wheel 14 along the conveyor 12 and communicate the sensed position of the wheel 14 to the controller 28.

Figure 4:
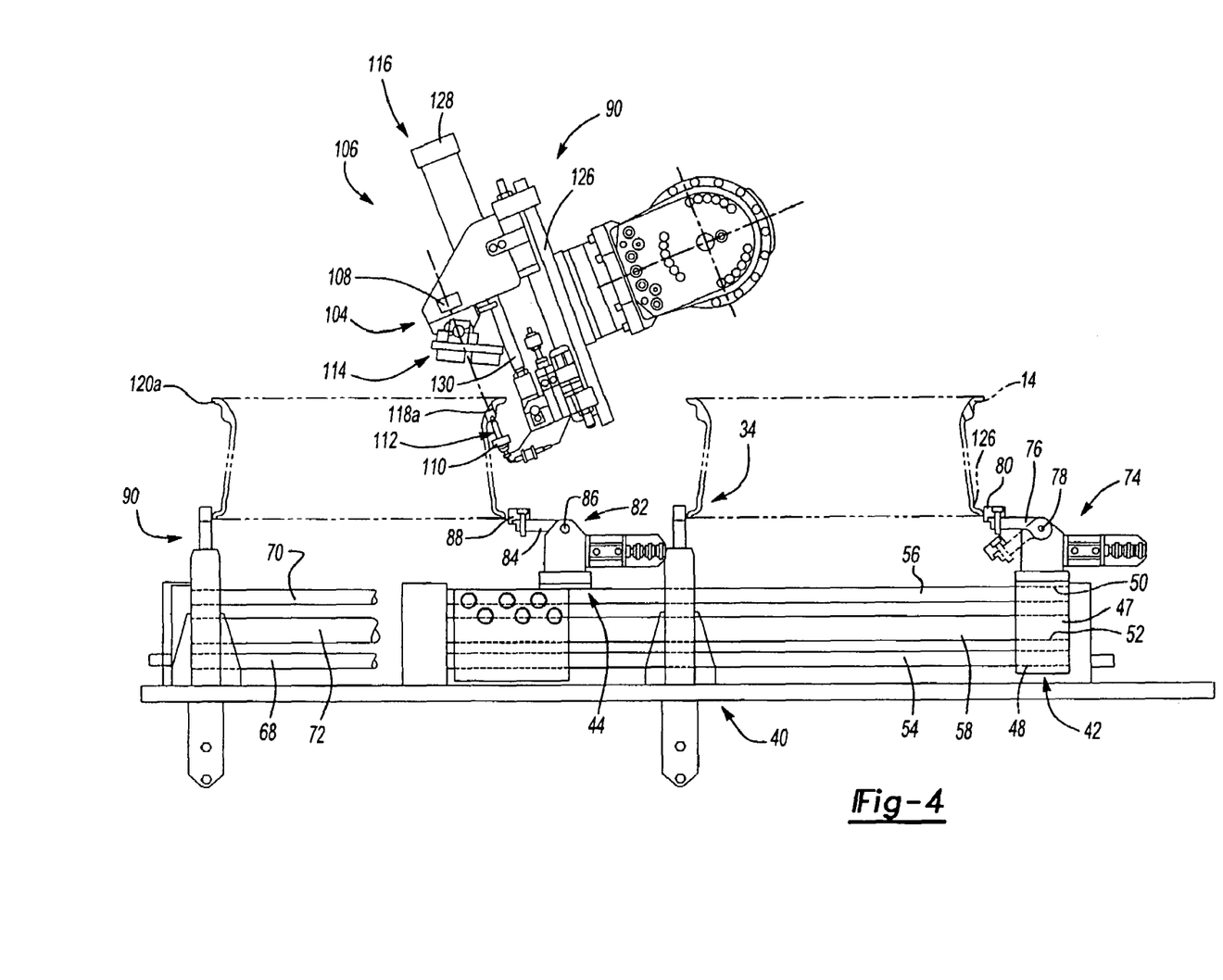
FIG. 4 is a partial cross-sectional view of the valve stem installation system shown in FIGS. 1-3 showing a positioning device for positioning a wheel and a locating and inserting assembly for inserting a valve stem in a valve stem aperture defined by a wheel.
Figure 5:
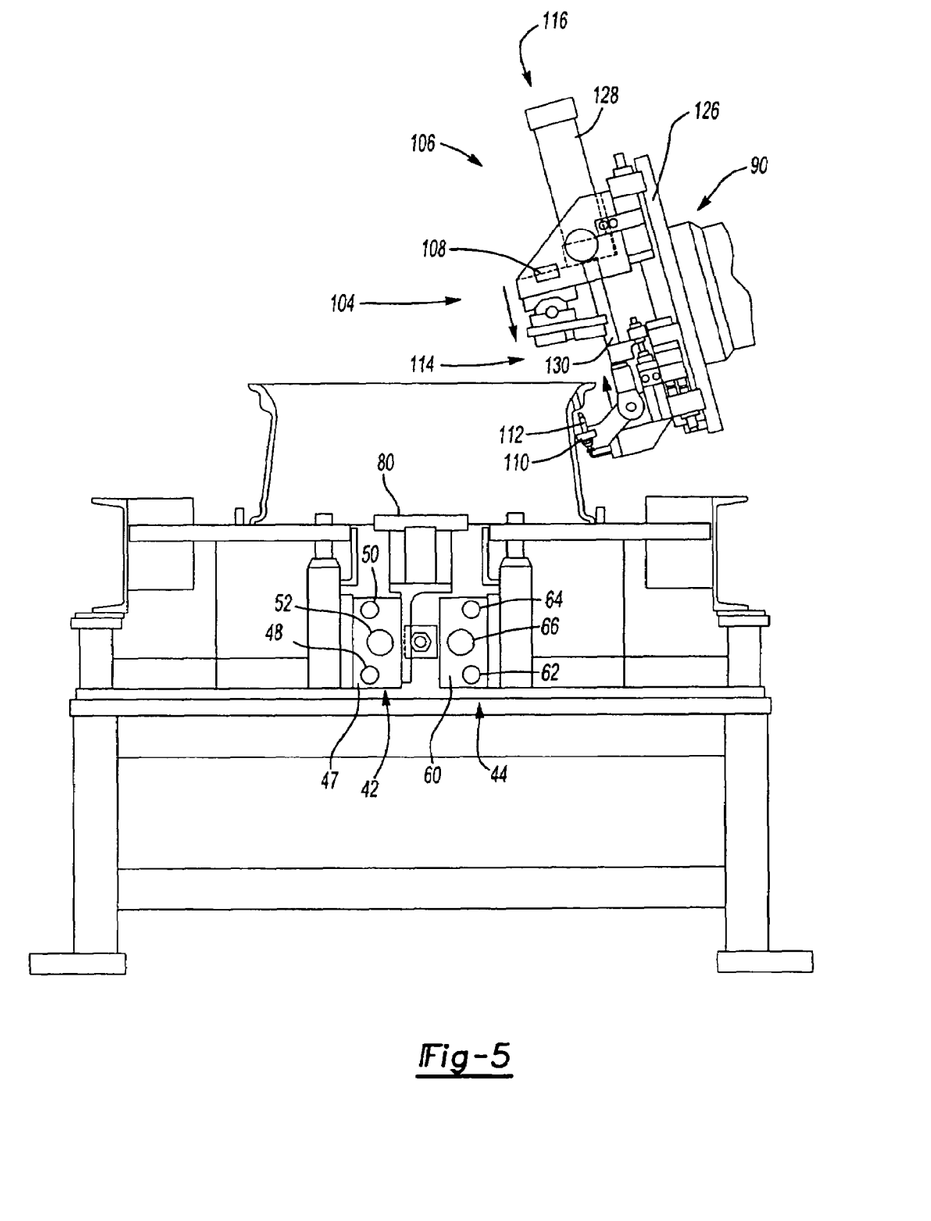
FIG. 5 is a partial cross-sectional view of the valve stem installation system shown in FIGS. 1-4 and offset ninety degrees from the view in FIG. 4, showing the positioning device and the locating and inserting assembly.

Referring now to FIGS. 1 and 3-5, a positioning device 40 is disposed along the conveyor 12 adjacent the robotic apparatus 16. The positioning device 40 includes a first positioning mechanism 42 and a second positioning mechanism 44. The positioning mechanisms 42, 44 are substantially similar with respect to one another and are disposed along the conveyor 12 between the first position 32 and a second position 46. The first positioning mechanism 42 includes a housing 47. The housing 47 defines apertures 48, 50 and 52 for receiving guide tracks 54, 56 and 58, respectively as best seen in FIGS. 4 and 5. The guide tracks 54, 56 and 58 guide movement of the housing 48 along the conveyor 12. A metal piston (not shown) is disposed internally of the guide track 58 and cooperate magnetically with the housing 48. For example, the housing 48 houses a magnet to attract the metal piston in the guide track 58. The piston is moved by selectively directing pressurized air to opposite sides of the piston in the guide track 58. The housing 48 moves in response to movement of the piston. The second positioning mechanism 44 is structured similarly and function similarly as the first positioning mechanism 42. For example, the second positioning mechanism 44 includes a housing 60 defining apertures 62, 64, 66 for receiving guide tracks 68, 70, 72, respectively, as best shown in FIGS. 4 and 5. A metal piston is disposed internally of the guide track 72 and cooperates with the housing 60 to move the housing 60 along the conveyor 12. Movement of the pistons inside the tracks 58, 72 are controlled by the controller 28.

Referring now to FIGS. 3-5, the first positioning mechanism 42 includes an engaging device 74 for engaging and moving the wheel 14 along the conveyor 12. The engaging device 74 is connected to the housing 47 and includes an arm 76 rotatable about an axis 78. An engaging portion 80 is disposed at the end of the arm 76 and is shaped to correspond to the shape of the wheel 14. During movement of the housing 47 along the conveyor 12 in the direction 20, the arm 76 is located in a first position shown in solid line in FIG. 4. After the housing 47 has moved a predetermined distance along the conveyor 12 in the direction 20, the arm 76 is moved to a second position shown in phantom in FIG. 4. The arm 76 is moved to the second position to prevent the engaging portion 80 from interfering with movement of a following wheel moving along the conveyor 12 and is therefore positioned below the conveyor 12. The positioning device 42 moves the wheel 14 along the conveyor 12 to a position along the conveyor 12 at which the second positioning mechanism 44 can engage the wheel 14. The second positioning mechanism 44 includes an engaging device 82 structured similarly and functioning similarly as the first engaging device 74. For example, the engaging device 82 includes an arm 84 rotatable about an axis 86 and an engaging portion 88 positioned at the end of the arm 84. The second positioning mechanism 44 moves the wheel 14 away from the robotic apparatus 16 after a valve stem has been inserted in the valve stem aperture defined by the wheel, a process described in greater detail below. Once the second positioning mechanism 44 moves the wheel 14, the first positioning mechanism 42 moves a second wheel 14 along the conveyor 12 until the second wheel 14 engages a second pair of pin stops 90, 92.

Figure 6:
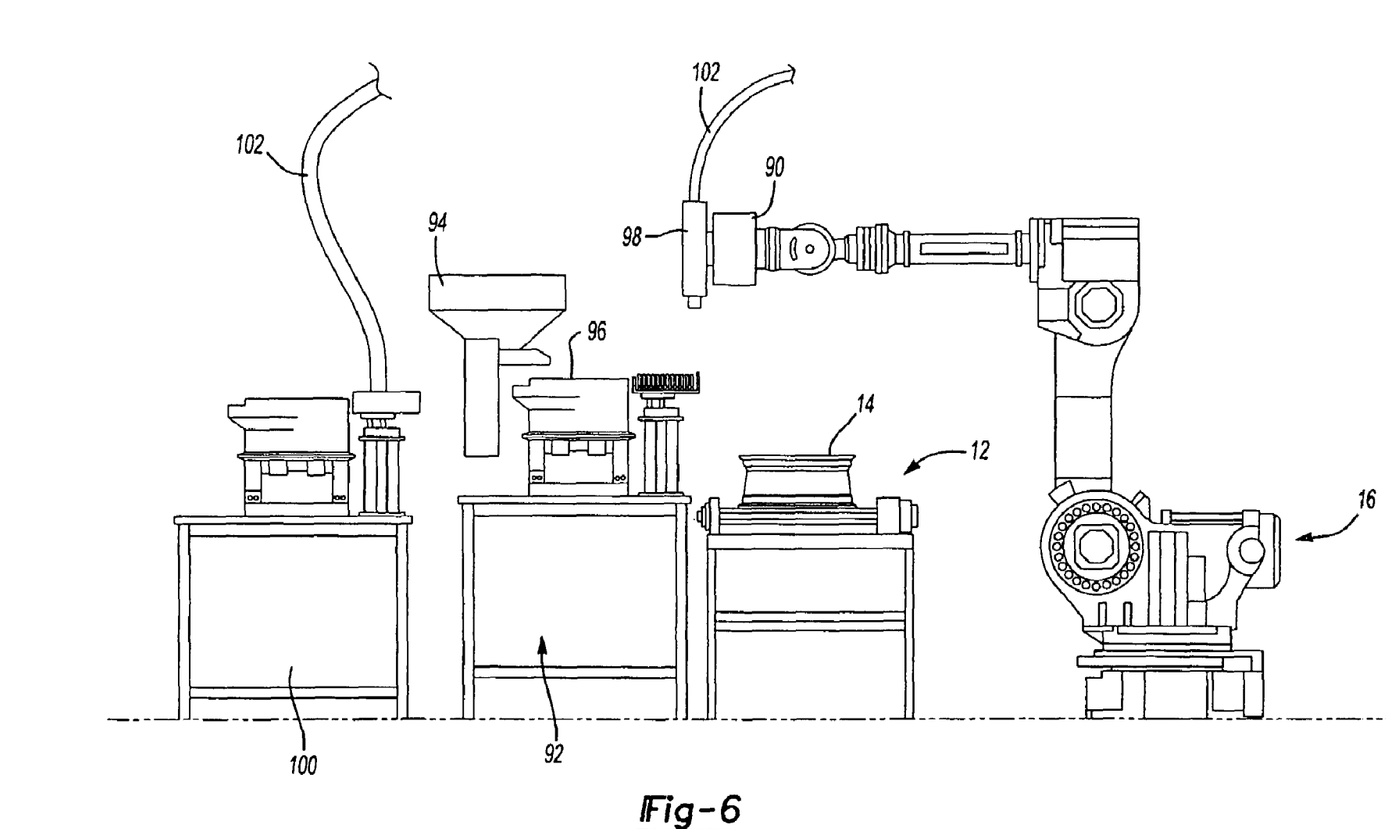
FIG. 6 is a side view of the valve stem installation system shown in FIG. 1 with additional structural details.

Referring now to FIGS. 1 and 6, after the wheel 14 is positioned adjacent the robotic apparatus 16 by the positioning device 40, the robotic apparatus 16 inserts a valve stem in the valve stem aperture defined by the wheel 14. The robotic apparatus 16 moves a locating and inserting assembly 90 around the wheel 14, shown schematically in FIGS. 1 and 6. The assembly 90 receives valve stems from one or more valve stem feeding stations 92 disposed along the conveyor 12. Each station 92 includes a hopper 94 for receiving valve stems and a sorting device 96 for sorting the valve stems and arranging the valve stems in an orientation to be received by the assembly 90. The different valve stem feeding stations 92 sort different configurations of valve stems. A nut runner 98 is attached to the assembly 90 to insert nuts on valve stems that require nuts. The nut runner 98 receives nuts from a nut feeding station 100 through a conduit 102. The station 100 can be disposed along the conveyor 12.

Referring now to FIGS. 4 and 5, the assembly 90 includes a locating device 104 and a stem inserting device 106. The locating device 104 includes a pair of light emitters, such as light emitter 108, and a pair of light receivers, such as light receiver 110. The inserting device 106 includes a valve stem holding pin 112, a support plate 114, and a moving device 116 for moving the holding pin 112 and the support plate 114 relative to one another.

Figures 7, 8, 9:
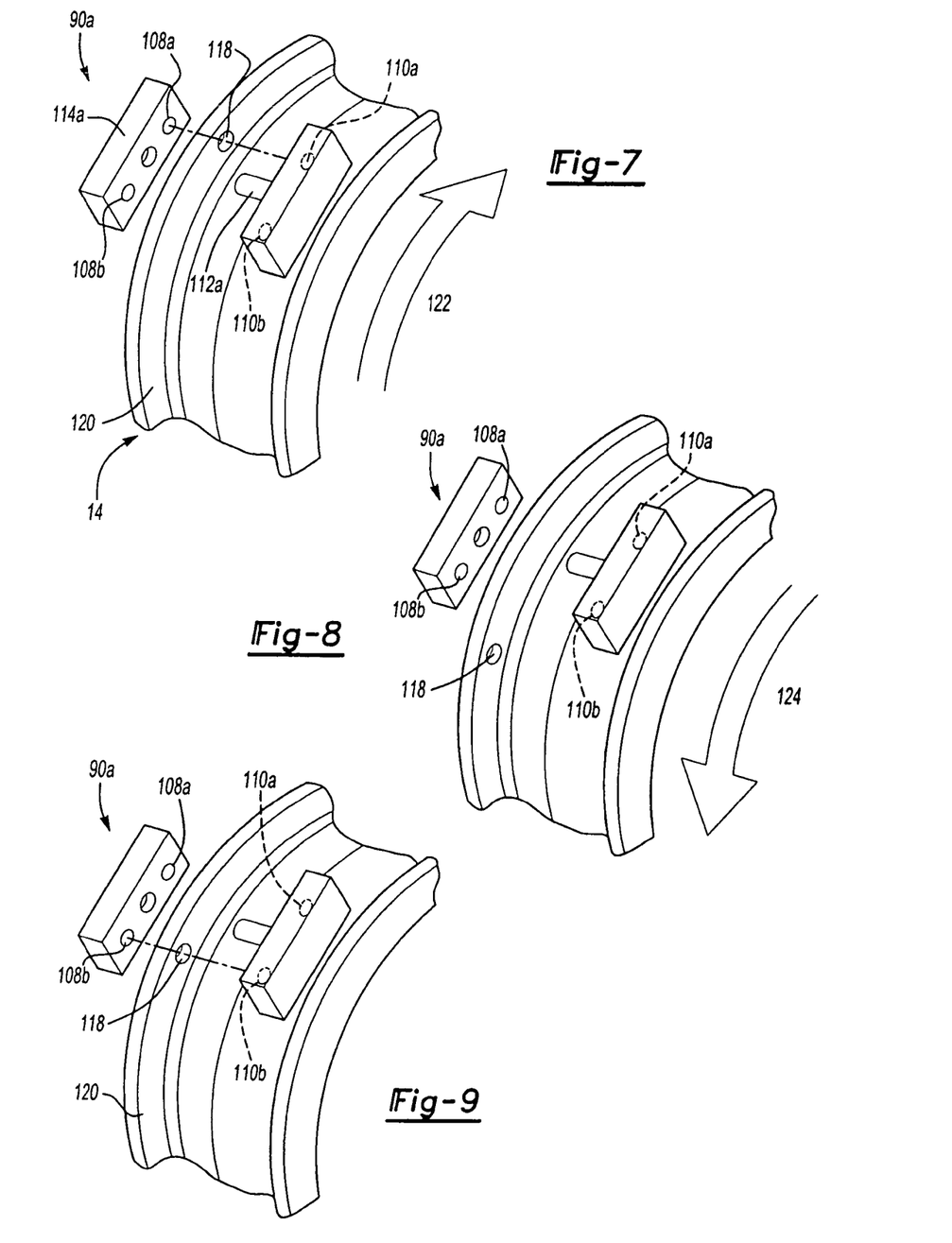
FIGS. 7-10 are perspective views illustrating a sequence of locating a valve stem aperture and inserting a valve stem in the valve stem aperture.

The method for locating the valve stem aperture in the wheel is shown schematically in FIGS. 7-10. In FIG. 7, the embodiment of the assembly 90a includes a pair of light emitters 108a and 108b, as well as a pair of light receivers 110a and 110b. The assembly also includes a support plate 114a and a valve stem holding pin 112a. The assembly 90a is moved around the wheel 14 in the direction 122. The light emitters 108a, 108b are disposed on an opposite side of a lip 120 of the wheel 14 with respect to the light receivers 110a, 110b. The valve stem aperture 118 is defined in the lip 120. The assembly 90a is moved in the direction 122 and the light receiver 110a receives light from the light emitter 108a through the valve stem aperture 118. The assembly 90a moves in the direction 122 at a predetermined angular velocity and is slowed by the controller 28 in response to the communication between the light emitter 108a and the light receiver 110a through the valve stem aperture 118.

Figure 10:
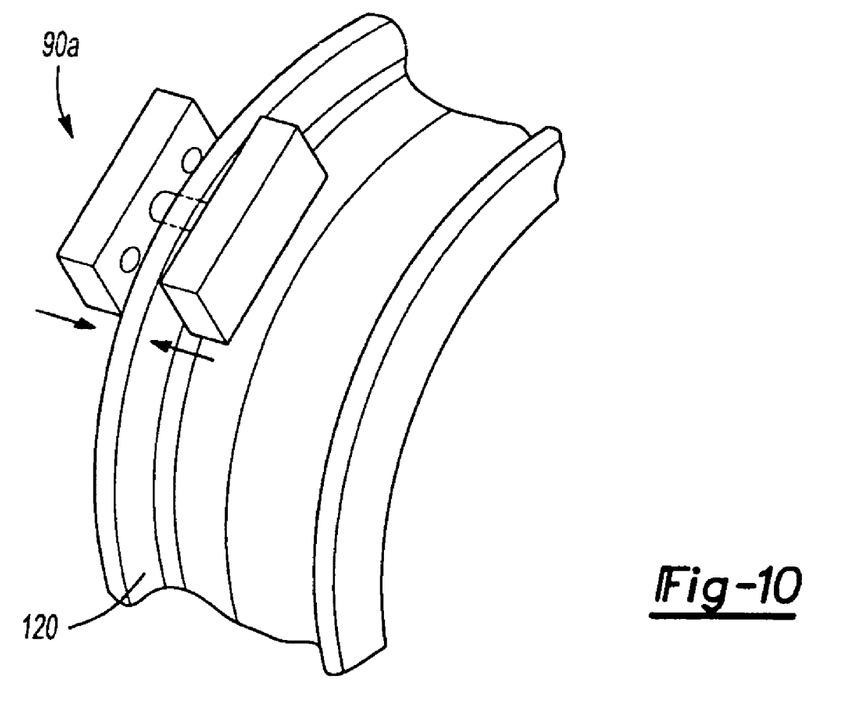

Referring now to FIG. 8, the assembly 90a is stopped after passing the valve stem aperture 118. Due to the delay between sensing the light by the first receiver 110a, signaling the controller 28, the assembly 90a typically passes the aperture 118 prior to stopping the robot 16. The assembly 90a is moved in the direction 124 until the light receiver 110b receives light from the light emitter 108b through the valve stem aperture 118, shown in FIG. 9. In response to the communication between the light receiver 110b and the light emitter 108b through the valve stem aperture 118, the assembly 90a is moved in the direction 122 until the valve stem holding pin 112 is aligned with the aperture 118 and the valve stem is then inserted, as shown in FIG. 10. The assembly 90a moves much faster in the direction of arrow 122 than in the direction of arrow 124 because more distance is typically traveled to first locate the aperture 118. Once the aperture 118 is located, the assembly moves at a slower rate in the direction of arrow 124 to determine a more precise location of the aperture 118 prior to aligning the stem holding pin 112a with the aperture 118.

Referring now to FIGS. 4 and 5, the valve stem is inserted in the valve stem aperture 118a defined in the lip 120a of the wheel 14 by engaging the moving device to move the valve stem holding pin 112 relative to the support plate 114. The moving device 116 includes a plate 126 attached to the robotic apparatus 16. The moving device 116 also includes a cylinder 128 attached to the plate 126 and a rod 130 extendable and retractable with respect to the cylinder 128. The valve stem holding pin 112 is fixedly associated with the end of the rod 130 and the support plate 114 is rotatably associated with the cylinder 128. After the valve stem aperture 118 has been located the robotic apparatus moves the support plate 114 to engage the lip 120a of the wheel 14. The rod 130 is retracted in the cylinder 128, moving the valve stem holding pin 112 through the aperture 118a. The rod 130 is extended to remove the valve stem holding pin 112 from the aperture 118a, leaving the valve stem in the valve stem aperture 118a.

Referring now to FIGS. 3 and 4, after the valve stem has been inserted in the valve stem aperture 118a, the second positioning mechanism 44 moves the wheel with the inserted valve stem along the conveyor 12 past the retracted pin stops 90-92. The wheel 14 now continues along the conveyor 12 for further processing operations.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility. In addition, the reference numerals in the claims are merely for convenience and are not to be read in any way as limiting.

The invention claimed is:

1. A method for inserting a valve stem in a valve stem aperture defined by a wheel comprising:

moving the valve stem relative to the valve stem aperture in a first rotational direction along a curved path to align the valve stem with the valve stem aperture;

locating the valve stem aperture with a first sensor of a first sensing device and a first sensor of a second sensing device, wherein said first and second sensing devices are movable in unison with each other, as the valve stem and the valve stem aperture are a first angular distance from one another along the curved path; and moving the valve stem relative to the valve stem aperture in a second rotational direction along the curved path opposite to the first rotational direction to align the valve stem with the valve stem aperture; and locating the valve stem aperture with a second sensor of the first sensing device and a second sensor of the second sensing device when the valve stem and the valve stem aperture are a second predetermined angular distance from one another along the curved path while moving in a second rotational direction.

2. The method of claim 1 including reducing a relative speed of the valve stem and the valve stem aperture relative to one another in the first rotational direction in response to the first sensor locating the valve stem aperture.

3. The method of claim 1 including positioning the first and second sensors on opposite sides of the valve stem along the curved path.

4. The method of claim 1 including moving the valve stem and the valve stem aperture relative to one another at a greater speed in the first rotational direction than in the second angular direction.

5. The method of claim 1 including the steps of:

moving the valve stem to the valve stem aperture with a robotic apparatus; and controlling the robotic apparatus in response to the first and second sensors.

6. A method for inserting a valve stem in a valve stem aperture defined by a wheel, comprising the steps of:

providing a work station proximate a robotic stemming assembly having first and second sensing devices each comprising of first and second sensors, wherein said first and second sensing devices are movable in unison relative to the wheel and a stemmer;

moving a wheel to said work station;

moving said robotic stemming assembly around the wheel in a first rotational direction along a curved oath until the first sensors of said first and second sensing devices detect the valve stem aperture;

moving said robotic stemming assembly around the wheel in a second rotational direction opposite the first rotational directional until the second sensors of said first and second sensing devices detect and locate the valve stem aperture; and inserting the valve stem into the valve stem aperture with the stemmer.

7. The method of claim 6 including the step of:

providing a controller operably connected to said robotic stemming assembly.

8. The method of claim 7 including the step of:

signaling said controller with the first sensors a general location of the valve stem aperture.

9. The method of claim 8 including the step of:
signaling said control the location of the valve stem aperture with the second sensors more precisely than the location signaled by said first sensors.

10. The method of claim 9 including the step of:
aligning said stemmer with the valve stem aperture in response to said signal generated by said second sensors.

11. The method of claim 10 including the step of:
moving the robotic stemming assembly in said first direction at a faster rate than said second direction.

12. The method of claim 11 including the step of:
receiving the wheel from said work station.

* * * * *

UNITED STATES PATENT AND TRADEMARK OFFICE
CERTIFICATE OF CORRECTION

| | | |
|---|---|---|
| PATENT NO. | : 7,340,815 B2 | Page 1 of 1 |
| APPLICATION NO. | : 11/699685 | |
| DATED | : March 11, 2008 | |
| INVENTOR(S) | : Dan Pellerin, Chad A. Sinke and Brian Hoy | |

It is certified that error appears in the above-identified patent and that said Letters Patent is hereby corrected as shown below:

Column 6, line 34, Please delete "angular" and replace with --rotational--.

Column 6, line 51, Please delete "oath" and replace with --path--.

Signed and Sealed this

Fifteenth Day of July, 2008

JON W. DUDAS
*Director of the United States Patent and Trademark Office*